(12) United States Patent
Kinzelmann et al.

(10) Patent No.: US 9,206,282 B2
(45) Date of Patent: Dec. 8, 2015

(54) LOW-MONOMER POLYURETHANE FOAMS

(71) Applicant: Henkel AG & Co. KGaA, Duesseldorf (DE)

(72) Inventors: Hans-Georg Kinzelmann, Pulheim (DE); Uwe Franken, Dormagen (DE); Christoph Lohr, Mettmann (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/170,700

(22) Filed: Feb. 3, 2014

(65) Prior Publication Data

US 2014/0179813 A1 Jun. 26, 2014

Related U.S. Application Data

(63) Continuation of application No. PCT/EP2012/059983, filed on May 29, 2012.

(30) Foreign Application Priority Data

Aug. 5, 2011 (DE) .................... 10 2011 080 513

(51) Int. Cl.
| | |
|---|---|
| C08G 18/10 | (2006.01) |
| C08G 18/12 | (2006.01) |
| C08G 18/76 | (2006.01) |
| C08G 18/48 | (2006.01) |
| C08G 18/42 | (2006.01) |
| C08G 18/40 | (2006.01) |
| C08K 5/01 | (2006.01) |
| C08K 5/521 | (2006.01) |
| C08K 5/00 | (2006.01) |

(52) U.S. Cl.
CPC .......... *C08G 18/4887* (2013.01); *C08G 18/10* (2013.01); *C08G 18/12* (2013.01); *C08G 18/4018* (2013.01); *C08G 18/4216* (2013.01); *C08G 18/4825* (2013.01); *C08G 18/7607* (2013.01); *C08G 18/7621* (2013.01); *C08G 18/7657* (2013.01); *C08K 5/01* (2013.01); *C08K 5/521* (2013.01); *C08G 2190/00* (2013.01); *C08G 2350/00* (2013.01); *C08K 5/0066* (2013.01)

(58) Field of Classification Search
None
See application file for complete search history.

(56) References Cited

U.S. PATENT DOCUMENTS

| 4,544,763 | A | * | 10/1985 | Narayan .......................... 560/26 |
| 4,623,709 | A | * | 11/1986 | Bauriedel ....................... 528/65 |
| 5,817,734 | A | * | 10/1998 | Pantone et al. ................. 528/76 |
| 5,925,781 | A | * | 7/1999 | Pantone et al. ................. 560/26 |
| 6,054,499 | A | * | 4/2000 | Pauls et al. .................... 521/132 |
| 6,515,164 | B1 | * | 2/2003 | Bolte et al. .................... 560/25 |
| 2012/0225225 | A1 | | 9/2012 | Franken et al. |

FOREIGN PATENT DOCUMENTS

| DE | 19700014 | | 7/1998 |
| DE | 10357093 | | 7/2005 |
| DE | 102005059710 | | 6/2007 |
| DE | 102009045027 | | 3/2011 |
| EP | 2159240 | | 3/2010 |
| WO | 02079291 | | 10/2002 |
| WO | WO 02079291 | A1 * | 10/2002 |
| WO | 2005054324 | | 6/2005 |
| WO | WO 2011036018 | A1 * | 3/2011 |

OTHER PUBLICATIONS

Voranol Product Information. Dow Chemical Company. Aug. 2000.*
International Search Report issued for International Patent Application No. PCT/EP2012/059983 mailed on Jan. 4, 2013.
EN ISO 2555, Jun. 1999.

* cited by examiner

*Primary Examiner* — Robert C Boyle
*Assistant Examiner* — Stephen Rieth
(74) *Attorney, Agent, or Firm* — James E. Piotrowski

(57) ABSTRACT

Cross-linkable foamable composition with low content of monomeric isocyanates, containing a pre-polymer of polyester diols and/or polyether dials reacted i) with asymmetric aromatic diisocyanates to form a reaction product with OH and NCO groups, ii) subsequent addition of and reaction with symmetric aromatic diisocyanate in a quantity at least equivalent to the available OH-groups, 0.1 to 30 wt % additives, at least one propellant, wherein the polyols have a molar mass (MN) of less than 5000 g/mol, and the reaction product has a content of less than 0.1 wt % monomeric asymmetric isocyanate and less than 2 wt % monomeric symmetric isocyanate.

14 Claims, No Drawings

LOW-MONOMER POLYURETHANE FOAMS

The invention relates to low-monomer one-component polyurethane foams. Storage stable crosslinkable foam precursors are provided here that possess high reactivity and on application result in a good formation of the foam material.

One-component PU foams are principally used for sealing and insulating joints in the building and do-it-yourself segments. In such applications, the foam product is applied from an aerosol can and is used for example for installing door frames and window frames in buildings. In order to fill the joints between frames and wall, the initial viscosity of the foam has to be sufficiently low in order to ensure an adequate expansion of the foam in the joint. The one-component PU foam becomes solid as a result of the crosslinking reactions with moisture.

Modern PU foam compositions normally contain a prepolymer that is formed from an isocyanate component and a polyol component. A high content of monomeric diisocyanates has been required in order to produce a polyurethane foam with adequate strength and low viscosity. The low viscosity enables a good foamability and fillability of the joint, as well as good metering from the can at normal temperature. Moreover in conventional foaming, the monomeric diisocyanate also makes a significant contribution to the reactivity of the foam. Consequently, one-component foams currently have a significant content of monomeric diisocyanates.

This causes problems during processing, in that volatile monomeric diisocyanates are released into the atmosphere of the workplace in the course of applying (foaming) the contents from the aerosol can. This is in regard to avoiding the adverse effects on health from the monomeric isocyanates. This is why there are restrictions in the use of PU foams that do not have a low-monomer content.

In WO 2002/079291 are described adhesive polymers that comprise a prepolymer of an isocyanate component that was reacted with a polyol, and a low-viscosity component that is unreactive towards isocyanates and OH groups. Here, the monomeric diisocyanates should make up less than 2% of the composition. Phosphate acid esters, adipic acid esters or phthalic acid esters are described as the unreactive low-viscosity component. In this way this mixture becomes free of unreacted monomeric isocyanates.

In WO 2005/054324 are described prepolymer compositions for the production of PU foams, wherein polyisocyanates and polyols can be comprised. The prepolymer is obtained by the reaction of an asymmetric polyisocyanate with sterically hindered polyols that contain at least two OH functions. A more detailed description of the polyols explains that in particular sterically hindered polyethylene glycols with propylene oxide end groups or polypropylene glycols can be employed or that low molecular weight diols with secondary or tertiary OH groups are employed. Reaction products with 2,4'-MDI are described as examples. A prepolymer having NCO groups of different reactivity is not described.

It is known that foams can be produced from PU prepolymers based on polyether polyols. They exhibit good properties. If they are adjusted to be low in monomer then, however, the viscosity is so high that these products can often only be used with additional diluents, such as plasticizers or solvents. Plasticizers or solvents are detrimental to health during the processing. Furthermore, they can diffuse out of the crosslinked foam, such that the properties of the crosslinked product are adversely affected.

Polyester polyol prepolymers can also be used in foam materials. It is likewise the case that the precursor materials have a high viscosity. This effect is especially amplified with low-monomer prepolymers. Consequently, they are not usually used as low-monomer components in foams. Moreover, it has been shown that PU foams with only low fractions of isocyanate groups or of monomeric isocyanates do not exhibit an adequate mechanical strength as crosslinked foam.

Prepolymers with a high monomer fraction have good properties but are restricted by the occupational safety requirements due to the monomeric diisocyanates. Distillation steps to reduce the monomeric isocyanate when producing the prepolymers give good results but are technically complex. TDI and its isomers have a high vapor pressure, such that the residual monomers have still to be significantly further reduced. Solid asymmetric aromatic isocyanates are expensive and have limited availability in greater quantities. Moreover, the less reactive NCO groups are more sluggish in the reaction, such that enhanced external conditions have to be established for a complete prepolymer synthesis with such NCO groups. However, more side reactions also occur, thereby leading to a deterioration in the viscosity behavior. Then predominantly fewer reactive groups are also comprised in the prepolymer.

Accordingly, the object of the present invention is to provide fast reacting, low-monomer PU prepolymers that can crosslink through NCO groups and which comprise little solvent or plasticizer. In this regard a suitable low viscosity should be maintained in order to be employed as a foam precursor in reactive crosslinking PU foams. In addition, a process control should be made possible which can obviate any distillation steps during the prepolymer production.

The object is achieved by means of a crosslinkable composition with a low isocyanate monomer content comprising a prepolymer produced from polyester diols and/or polyether diols reacted i) with an asymmetric aromatic diisocyanate (A) to yield a reaction product containing OH and NCO groups, ii) subsequent reaction with a symmetric aromatic diisocyanate (S) in a quantity at least equivalent to the OH groups present, 0.1 to 30 wt % additives, wherein the diols exhibit a molar mass ($M_N$) of less than 5000 g/mol, and the reaction product a) has a content of monomeric asymmetric diisocyanate (A) of less than 0.1 wt % and of monomeric symmetric diisocyanate (S) of less than 2 wt %, characterized in that the composition comprises at least c) one blowing agent in an amount that can foam the composition.

A necessary component of the inventive composition is prepolymers based on polyesters and/or polyethers (a). These can be produced by reacting polyester polyols and/or polyether polyols with diisocyanates. Suitable polyester polyols are reaction products of polyhydric, preferably dihydric alcohols, optionally together with minor amounts of trihydric alcohols, and polyfunctional, preferably difunctional and/or trifunctional carboxylic acids. Instead of free polycarboxylic acids, the corresponding polycarboxylic acid anhydrides or corresponding polycarboxylic acid esters with alcohols having preferably 1 to 3 carbon atoms can also be employed. Those polyols and carboxylic acids known for the production of polyesters can be selected. For the production of these types of polyester polyols, suitable exemplary diols are ethylene glycol, 1,2- or 1,3-propane diol, 1,2- or 1,4-butane dial, pentane dial, the isomeric hexane diols, octane dial, 1,4-hydroxymethylcyclohexane, 2-methyl-1,3-propane dial, 1,2,4-butane triol, triethylene glycol, tetraethylene glycol, polyethylene glycol, dipropylene glycol, polypropylene glycol, dibutylene glycol or polybutylene glycol. Aromatic diols can also be used.

The employed polycarboxylic acids can be aliphatic, cycloaliphatic, aromatic or heterocyclic or both. They can be optionally substituted, for example by alkyl groups, alkenyl groups, ether groups or halides. Succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, glutaric anhydride, maleic acid, maleic anhydride, fumaric acid, dimer fatty acids or mixtures of two or more thereof are suitable exemplary polycarboxylic acids. Citric acid or trimellitic acid are exemplary suitable tricarboxylic acids that can optionally be comprised pro rata. All the cited acids can be added individually or as mixtures of two or more.

However, polyester polyols of oleochemical origin may also be used. Such types of polyester polyols can be manufactured by the total ring opening of epoxidized triglycerides of a fat mixture comprising at least partially olefinically unsaturated fatty acids with one or more alcohols having 1 to 12 carbon atoms and subsequently partially transesterifying the triglyceride derivatives to alkyl ester polyols having 1 to 12 carbon atoms in the alkyl group.

Polycarbonate polyols are also suitable polyester polyols. Polycarbonates can be obtained for example by the reaction of diols such as propylene glycol, 1,4-butane diol or 1,6-hexane diol, diethylene glycol, triethylene glycol or tetraethylene glycol or mixtures of two or more thereof with diaryl carbonates, for example diphenyl carbonate, or with phosgene. Another group of the inventively employable polyols are polylactones, for example polyesters based on ε-caprolactone. Polyester polyols that comprise one or more urethane groups in the molecular chain are also suitable.

Polyester polyols preferably have a molecular mass of ca. 200 to 5000 g/mol, especially less than 2000 g/mol (number average molecular mass, $M_N$, measured by GPC). In particular, polyester polyols that comprise aromatic structures, for example through phenyl or naphthyl groups, are also suitable.

Exemplary suitable polyether polyols are the reaction products of low molecular polyhydric alcohols with alkylene oxides. The alkylene oxides preferably possess 2 to 4 carbon atoms. The reaction products of ethylene oxide, propylene oxide, butylene oxide or mixtures thereof with aliphatic diols, such as ethylene glycol, propane-1,2-diol, propane-1,3-diol, the isomers of butane dials, hexane diols, 2,2-dimethylpropane-1,3-diol, 2-methylpropane diol, hexane-1,6-diol, 2,4,4-trimethylhexane-1,6-diol, 2,2,4-trimethylhexane-1,6-diol, 1,4-cyclohexane dimethanol, or of aromatic diols, such as 4,4'-dihydroxydiphenylpropane, Bisphenol A, Bisphenol F, pyrocatechol, resorcinol, hydroquinone or mixtures of two or more thereof are exemplary suitable. Furthermore, the reaction products of polyhydric alcohols, such as glycerin, trimethylolethane or trimethylolpropane, pentaerythritol or sugar alcohols with the alkylene oxides can also be suitable. In the context of the invention, further suitable polyols are obtained by polymerizing tetrahydrofuran (poly-THF).

According to the invention, free-flowing polyether polyols should be selected, for example polyether polyols with a molecular mass of 150 to 5000 g/mol, in particular up to 3000, preferably 200 to 2000 g/mol, are suitable. Dials are particularly suitable, such as homopolymers of polyethylene glycol, propylene glycol, block or statistical copolymers of ethylene glycol and propylene glycol, in particular those that comprise secondary hydroxyl groups.

Suitable polyether polyols or polyester polyols are known to the person skilled in the art and are commercially available. Mixtures of polyols that possess three or in particular two terminal OH groups are particularly suitable, preferably with an average functionality of less than 2.5, especially diols. The polyether polyol fraction should preferably be more than 65%, another embodiment exclusively comprises polyether polyols.

The known aromatic monomeric diisocyanates are known as isocyanates for the production of NCO-containing prepolymers. They have a molecular mass of less than 500 g/mol. Accordingly, examples of asymmetric diisocyanates that can be used are xylylene diisocyanate (XDI), tetramethylxylylene diisocyanate (TMXDI), 1,3-phenylene diisocyanate. Naphthalene-1,5-diisocyanate (NDI) or 1,4-phenylene diisocyanate are possible symmetric aromatic diisocyanates. In reaction step i), 2,4-tolulyene diisocyanate (TDI), isomeric mixtures of the TDI or 2,4'-diphenylmethane diisocyanate (MDI) are preferably employed as the asymmetric isocyanates; in reaction step ii), especially the symmetric isocyanates should be employed, such as 2,2'-diphenylmethane diisocyanate or 4,4'-diphenylmethane diisocyanate as well as their isomeric mixtures.

According to the present invention, the polyols are treated with a deficit of fast reacting NCO groups of the asymmetric diisocyanate. The reaction of the monomeric diisocyanates with the polyols occurs at a temperature between 20° C. and 100° C., preferably between 25 and 80° C. and especially preferably between 40 and 75° C. The quantities are selected such that a prepolymer is obtained that possesses NCO groups and free OH groups. It is also possible to initiate the reaction ii) before the end of the reaction step i), such that the number of the free OH groups is increased.

The quantity of the asymmetric diisocyanate (A) is selected such that an NCO/OH ratio of 0.5:1 to 2:1 is employed. In a further step of the reaction a symmetric diisocyanate (S), in particular 4,4'-MDI, is added to the reaction product. The quantity of the MDI is selected such that an NCO(S)/OH (free) ratio of 1:1 to ca. 21:1 is obtained, especially up to 2.1:1. Preferably, prepolymers are therefore inventively obtained that on average have at least one terminal TDI group and optionally a terminal MDI group.

As a mixture in the monomer-poor state, the polyether/polyester prepolymers have a viscosity from 10 000 to 150 000 mPas at 50° C. (measured by Brookfield, EN ISO 2555). The monomer content of unreacted monomers should be less than 2 wt %, preferably less than 1.0 wt %. The quantity of monomeric TDI should be less than 0.1 wt %, especially less than 0.05 wt %. The prepolymers should have an NCO content of 4 to 8 wt %. Prepolymers that have been produced with only a low molecular weight structure are quite particularly preferably used.

In addition, the composition according to the invention can also comprise additives that are known for foam production as the foam precursor. These can be for example plasticizers, stabilizers, adhesion promoters, catalysts, flame retardants, biocides, cell openers and similar adjuvants. In such a case it is advantageous to maintain as low as possible the fraction of ingredients that are not reacted in the polymer, such as plasticizers or solvents.

Up to 40 wt % of plasticizers can be comprised in the foam precursor, in particular even no plasticizer or between 0.5 and 20 wt %, based on the total composition of the non-volatile ingredients. Plasticizers with polar groups are preferred. Suitable plasticizers are known to the person skilled in the art and are commercially available.

In the context of this invention, stabilizers are understood to mean antioxidants, UV-stabilizers, hydrolysis stabilizers or foam stabilizers. Examples of these are the commercial sterically hindered phenols and/or thioethers and/or substituted benzotriazoles and/or amines of the HALS type (Hindered Amine Light Stabilizer). In the context of the present invention, it is particularly preferred if a UV stabilizer is employed that carries a silane group and becomes attached to the end product during crosslinking or curing. Furthermore, benzotriazoles, benzophenones, benzoates, cyanoacrylates, acrylates or sterically hindered phenols can also be added. Exemplary foam stabilizers are polyether siloxanes, such as copolymers of ethylene oxide and propylene oxide bonded to a polydimethylsiloxane residue, polysiloxane-polyoxyalkylene copolymers branched through allophanate groups, other organopolysiloxanes, such as dimethylpolysiloxanes; oxyethylated alkylphenols, oxyethylated fatty alcohols, and/or paraffin oils. Furthermore, for improving the emulsifying action, the cell structure and/or stabilization, oligomeric polyacrylates containing polyoxyalkylene and fluoroalkane groups as the side chain groups are suitable. The inventively foamable mixtures can comprise foam stabilizers e.g. in amounts ranging between 0.1 and 5 wt %, based on the mixture of the non-volatile fractions.

If needed, organofunctional silanes, such as hydroxy-functional, (meth)acryloxy-functional, mercapto-functional, amino-functional or epoxy-functional silanes can preferably be used as the adhesion promoters. The amounts can range between 0 and 10 wt %, preferably between 0 and 5 wt %, based on the mixture.

Catalysts can also be comprised. All known compounds that can catalyse the isocyanate reactions can be added as the catalysts. Examples of these are titanates such as tetrabutyltitanate and tetrapropyltitanate, tin carboxylates such as dibutyltin dilaurate (DBTL), dibutyltin diacetate, tin octoate; tin oxides such as dibutyltin oxide, and dioctyltin oxide; organoaluminum compounds such as aluminum trisacetylacetonate, aluminum trisethyl acetoacetate; chelate compounds such as titanium tetraacetylacetonate; amine compounds such as triethylenediamine, guanidine, diphenylguanidine, 2,4,6-tris(dimethylaminomethyl)phenol, morpholine, N-methylmorpholine, 2-ethyl-4-methylimidazole, and 1,8-diazabicyclo-(5,4,0)-undec-7-ene (DBU), 1,4-diazabicyclo[2,2,2]octane, N,N-dimethylpiperazine, 1,8-diazabicyclo[5.4.0]undec-7-ene, dimorpholinodimethyl ether, dimorpholinodiethyl ether (DMDEE) or their mixtures. The catalyst, preferably mixtures of a plurality of catalysts, are added in an amount of 0.01 to about 5 wt %, based on the total weight of the preparation.

In another embodiment, a foamable mixture according to the invention comprises at least one liquid flame retardant. The flame retardant can be selected from the group of the halogenated (especially brominated) ethers of the "Ixol" type from the Solvay company, 3,4,5,6-tetrabromo-, 2-(2-hydroxyethoxy)ethyl-2-hydroxypropyl ester), organic phosphates, in particular diethyl ethanephosphonate, triethyl phosphate, dimethyl propyl phosphonate, diphenyl cresyl phosphate, as well as chlorinated phosphates, in particular tris-(2-chloroethyl) phosphate, tris-(2-chloroisopropyl) phosphate, tris(1,3-dichloroisopropyl) phosphate, tris(2,3-dibromopropyl) phosphate and tetrakis(2-chloroethyl) ethylene diphosphate or their mixtures. The mixture preferably comprises the flame retardant in an amount of 1 to 50 wt %, particularly preferably from 5 to 20 wt %, based on the total weight of the mixture. From the abovementioned flame retardants, it is advantageous to select those that do not possess hydroxyl groups, as these groups reduce the content of reactive NCO groups.

A foamable composition according to the invention comprises, in addition to the mixture of the prepolymer, at least one blowing agent. Numerous highly volatile hydrocarbons can, in principle, be used as the blowing agent. Particularly preferred blowing agents are selected from hydrocarbons and/or fluorinated hydrocarbons each with 1-5 carbon atoms and/or dimethyl ether (DME) as well as their mixtures, for example DME/propane/isobutane/n-butane.

In a particular embodiment, it is advantageous that at least partially polar blowing agents are comprised. Optionally, non-polar blowing agents can be additionally employed. The known highly volatile hydrocarbons that have 1 to 5 carbon atoms are understood as the non-polar blowing agents. Polar blowing agents are understood to mean those substances that have a considerable vapor pressure at 20° C. and are polar. They concern compounds that, in addition to the hydrocarbon moieties, have further heteroatoms, especially oxygen, fluorine or chlorine. Examples of such compounds are dimethyl ether (DME), diethyl ether, dimethoxymethane, dimethoxyethane, acetone, 1,1-difluoroethane (R152a) or 1,1,1,2-tetrafluoroethane (R134a). Such polar blowing agents can be comprised singly or in a mixture.

The blowing agents are added for example in amounts of 5 to 40 wt %, preferably 10 to 30 wt %, based on the total foamable mixture. In particular, a high fraction of polar blowing agents should be employed, for example more than 25% of polar blowing agent (based on the weight of all blowing agents) should be comprised, especially more than 50%. DME and/or dimethoxymethane are quite particularly preferred as the polar blowing agent.

A preferred embodiment of the foam precursor mixture according to the invention can comprise 0 to 70 wt %, preferably 0 to 35 wt % of a polyester prepolymer with NCO groups, 99.5 to 30 wt %, especially 99.5 to 65 wt % polyoxyalkylene prepolymer with NCO groups, 0.5 to 30 wt % auxiliaries and additives, especially catalysts, flame retardants and/or stabilizers. The total of these ingredients should amount to 100 wt %. The mixture according to the invention also additionally comprises inert blowing agents.

A further subject matter of the present invention is a disposable pressure vessel comprising a foamable mixture according to the invention. The disposable pressure vessel (aerosol can) therefore comprises at least one prepolymer or a mixture and at least one blowing agent. In order to enable easy processing of the mixture—especially the filling of the container—the viscosity of the mixture of the non-volatile ingredients (without blowing agent) ranges inventively from 10 000 to 150 000 mPas (measured at 50° C.).

The foamable mixtures according to the invention cure after being deployed out of the aerosol can by reacting with the ambient humidity to form fine celled foams, such that the foamable mixtures are suitable for sealing, insulating and/or installing, e.g. joints, roof surfaces, windows and doors or for filling up cavities.

Accordingly, a further subject matter of the present invention is also the use of a foamable mixture according to the invention or a mixture, produced according to a process according to the invention, for sealing, insulating and/or installing joints, roof surfaces, windows and doors or for filling up cavities.

Another subject matter of the invention is a process for producing foamable, crosslinkable compositions. According to this process, an intermediate product of at least one polyether diol and/or polyester diol with an asymmetric aromatic diisocyanate (A) is produced. Here the quantity should encompass a ratio NCO(A):OH of 2:1 to 1:1. An intermediate product is obtained that possesses OH groups and NCO groups. This is then immediately reacted on the still present OH groups with a symmetrical aromatic diisocyanate (S). The quantity is selected such that an NCO(S):OH ratio of 1:1 to 2.7:1 is obtained. Prepolymers are obtained in this way which for example comprises reactive NCO groups based on TDI and optionally MDI. A low content of monomeric free isocyanates is obtained by the process procedure.

An additional crosslinkable prepolymer based on polyester polyols can be added to a prepolymer based on polyether. Similarly, mixtures of the polyols can also be reacted in common. After the reaction additives that can be comprised in a composition according to the invention can be added as needed. At least one propellant gas is additionally added to this mixture. This can be effected by mixing the prepolymer/additive mixture with propellant gas, this mixture being subsequently filled into the appropriate disposable pressure vessel. It is likewise possible to put the various prepolymers and additives individually into the appropriate container and then add the propellant gas. The components are blended together using known techniques. The mixing of the components can also be supported by heating, such that the processing processes proceed faster. Foamable mixtures, filled up in disposable pressure vessels are obtained. As long as one works under anhydrous conditions, the mixtures are storage stable for a period of at least 6 months.

The foamable compositions according to the invention are particularly applicable for use as a one-component canned foam. They are usually called in-situ foam, i.e. they are filled into aerosol cans for the production and storage and transport and dispensed and foamed directly for the application. The composition according to the invention enables isocyanate-reactive polyurethane foams to be produced that have a low monomer content. They have a composition that has an adequate viscosity in order to be foamable with the known blowing agents.

Due to the low content of free isocyanates, the requirements with regards to work safety and protection of health are fulfilled. The technical application properties of the foamed materials are equally as good in comparison with the known prior art.

The foamable mixtures according to the invention cure after being dispensed from the aerosol can react with the ambient humidity to form fine celled foams, such that the foamable mixtures are suitable for sealing, insulating and/or installing, e.g. joints, roof surfaces, windows and doors or for filling up cavities.

EXAMPLES

Quantities in Parts

In a three-necked flask a PPG (487.5 g, hydroxyl number 237) and a polyester of adipic acid, isophthalic acid/PPG/diethylene glycol (56.2 g, hydroxyl number 137) were mixed together with 2,4'-TDI (269 g). An NCO value of 6.8% was obtained after heating to ca. 80° C. with stirring for one hour. 4,4'-MDI (57.5 g) was then added and stirring was continued for two hours at 80° C. An NCO end value of ca. 6.1% was obtained.

NCO:OH ($1^{st}$ step)=1.5:1
NCO:OH ($1^{st}$ step)=2.3:1%
% monomeric TDI: 0.02%
% monomeric MDI: 0.8%
NCO-tot: 6.1%
Viscosity 44 500 mPas (50° C.)

Foamable compositions were produced by adding to the polymer a mixture of propane/dimethyl ether (1:1), weight fraction 30% to the whole mixture. These mixtures were filled into a disposable pressure container. The mixtures were homogenized by shaking and stored for one day. It was found that the mixtures were easily dispensed as a foam. They crosslinked quickly.

Additional experiments were carried out with additives. They did not significantly influence the foamability.
Example 1+0.05% DMDEE as the catalyst
Example 1+0.4% paraffin oil
Example 1+0.2% UV-stabilizer
Example 1+5% trichloro isopropyl phosphate

The invention claimed is:

1. A crosslinkable composition with a low content of monomeric isocyanates comprising:
   a) a prepolymer produced from polyester polyols and/or polyether polyols reacted i) with an asymmetric aromatic diisocyanate to yield a reaction product containing OH and NCO groups, ii) subsequent reaction with symmetrical aromatic diisocyanates in a quantity at least equivalent to the OH groups present, wherein the prepolymers have a viscosity from 10,000 to 150,000 mPas at 50° C. (measured by Brookfield, EN ISO 2555),
   b) 0.1 to 30 wt % additives based on weight of the prepolymer and the additives, and
   c) at least one blowing agent in a quantity capable of foaming the composition;
   wherein the polyols exhibit a molar mass (MN) of less than 5000 g/mol, and the prepolymer a) has a content of monomeric asymmetric diisocyanates (A) of less than 0.1 wt % and of monomeric symmetric diisocyanates (S) of less than 2 wt % and the NCO(isocyanate S):OH ratio of the OH groups still present to the NCO groups of the symmetrical diisocyanate of ii) is 1:1 to 2.7:1, and 4,4'-MDI is used.

2. The composition according to claim 1, wherein the NCO (isocyanate A):OH ratio in reaction i) is 0.5:1 to 2:1, and wherein 2,4-toluylene diisocyanate (TDI) or its isomeric mixtures is used.

3. The composition according to claim 1, wherein the mixture of the polyols comprises 50 to 100 wt % of linear polyether diols with a molar mass of less than 2,000 g/mol.

4. The composition according to claim 1, wherein the viscosity of the mixture of the components a and b is between 10,000 and 150,000 mPas at 50° C.

5. The composition according to claim 1, wherein the additives are selected from one or more of plasticizers, foam stabilizers, catalysts, flame retardants, dyes, pigments, cell openers, and UV-stabilizers.

6. The composition according to claim 1, being free of plasticizers.

7. The composition according to claim 1, including 5-40 wt % blowing agents, based on the total foamable composition.

8. The composition according to claim 1, including polar blowing agents or mixtures of polar blowing agents with C1 to C5 alkanes.

9. The composition according to claim 1, including up to 30 wt % relative to the total composition of polar blowing agents or mixtures of polar blowing agents with C1 to C5 alkanes.

10. The composition according to claim 1, wherein the prepolymer has an NCO content of 6 to 8 wt %.

11. A disposable pressure vessel comprising a composition according to claim 1.

12. A process for producing the foamable crosslinkable composition of claim 1, comprising:
   reacting at least one polyether polyol and TDI in an NCO/OH ratio of 0.5:1 to 2:1, the resulting reaction product still comprises OH groups,
   reacting said reaction product with 4,4'-MDI in an equivalent ratio of NCO (isocyanate S) to OH groups present of 1:1 to 2.7:1 to form a prepolymer, and
   the prepolymer together with additives and blowing agent is filled into a disposable container.

13. The process according to claim 12, wherein a mixture of polyether polyols and polyester polyols is reacted with TDI.

14. Cured foam reaction products of the composition of claim 1.

* * * * *